United States Patent [19]

Ström

[11] Patent Number: 5,876,608

[45] Date of Patent: *Mar. 2, 1999

[54] PURIFICATION METHOD

[75] Inventor: Gunnar Ström, Upsala, Sweden

[73] Assignee: Alfa Laval Separation AB, Tumba, Sweden

[ * ] Notice: This patent issued on a continued prosecution application filed under 37 CFR 1.53(d), and is subject to the twenty year patent term provisions of 35 U.S.C. 154(a)(2).

[21] Appl. No.: 628,635

[22] PCT Filed: Oct. 18, 1994

[86] PCT No.: PCT/SE94/00980

§ 371 Date: Jun. 27, 1996

§ 102(e) Date: Jun. 27, 1996

[87] PCT Pub. No.: WO95/11325

PCT Pub. Date: Apr. 27, 1995

[30] Foreign Application Priority Data

Oct. 18, 1993 [SE] Sweden .................................. 9303437

[51] Int. Cl.⁶ .................................................. B01D 17/04
[52] U.S. Cl. ........................... 210/708; 134/13; 210/727; 210/728; 210/735; 568/622
[58] Field of Search ........................ 134/10, 13; 210/708, 210/727, 728, 732, 735; 568/622

[56] References Cited

U.S. PATENT DOCUMENTS

| | | | |
|---|---|---|---|
| 3,763,277 | 10/1973 | Chu et al. | 210/732 |
| 3,802,917 | 4/1974 | Treat et al. | |
| 4,374,740 | 2/1983 | Chen | 210/732 |
| 4,497,663 | 2/1985 | Fisher et al. | 210/732 |
| 4,844,811 | 7/1989 | Gotlieb et al. | 210/732 |
| 5,039,450 | 8/1991 | Kupfer et al. | 210/708 |
| 5,167,281 | 12/1992 | Kalfoglou | |
| 5,256,304 | 10/1993 | Meyer et al. | 210/708 |

FOREIGN PATENT DOCUMENTS

| | | |
|---|---|---|
| 0 069 435 | 1/1983 | European Pat. Off. . |
| 462393 | 6/1990 | Sweden . |
| 900576 | 5/1990 | WIPO . |

Primary Examiner—Jay H. Woo
Assistant Examiner—Betsey J. Morrison
Attorney, Agent, or Firm—Bacon & Thomas

[57] ABSTRACT

The invention relates to a method of purifying contaminated degreasing liquids including (a) adding a collection polymer or polymer mixture forming two phases to the degreasing liquid; (b) mixing the collection polymer with the degreasing liquid; (c) separating the collection polymer and the degreasing liquid gravimetrically, whereby the collection polymer and the major part of the contaminants form a hydrophobic bottom phase and the degreasing agent forms a hydrophilic top phase; (d) removing the bottom phase; and (e) reusing the top phase directly or for further processing.

11 Claims, 2 Drawing Sheets

PURIFICATION METHOD

TECHNICAL FIELD

The present invention relates to methods, means and compositions for purification of contaminated oil-containing aqueous liquids, and to the use of such means and compositions for separation and/or purification purposes.

BACKGROUND OF THE INVENTION

Oil containing liquids and, conversely, liquids containing oil are used for many purposes.

Degreasing is used for removing oil, fat, organic substances and the like, as well as non-organic particles from goods and other matter. As used herein the term "degreasing" is thus not limited to removing contaminating grease, but it includes any fatty, grease, or functionally similar contaminating matter. The most important chemical agents for industrial degreasing and purification are chlorinated solvents such as methylene-, tri- and per-chloroethylene and the like, as well as water-soluble alkaline degreasing agents.

In Sweden at least 10,000 companies carry out degreasing. The costs for degreasing amount to about 1500 million SEK per year. The investments made in degreasing apparatuses correspond to an estimated 1000 million Swedish crowns. Only as regards destruction costs these were about 1750 SEK/cubic meter.

Water-based degreasing can provide increased purity compared to solvent-based degreasing since it, when carried out correctly, can remove both oil, fat, particles and salts.

Because the nature of most of the relevant metals is that they have a negative surface charge, alkaline degreasing is a most common and most efficient cleaning method. Neutral degreasing can be suitable when the goods to be cleaned only consist of light and recently greased material. Acid degreasing is used to a considerably less extent and is primarily applicable when it is desirable to simultaneously get a certain de-oxidation (for example metals from the type aluminum and stainless steel).

Because of inner and outer environmental problems when using chlorinated solvents, conventional alkaline degreasing is presently the quickest. The alkaline degreasing agents are built-up of an alkaline substance (e.g. sodium hydroxide or sodium carbonate), complex forming agents (such as tripolyphosphate), and surfactants, usually non-ionic tensides.

In water-based degreasing the compounds are emulgated and fats and oils which can be saponified are converted into water-soluble soapes. Mechanical energy has to be added for the dispersion to be obtained efficiently and within reasonable time. Efficient degreasing also requires a high temperature, which is above the melting point of the impurity.

After a certain time of service the cleaning properties of the degreasing bath deteriorate. This is most often caused by contamination by oil and particles. Other common contaminants in the washing liquid system are hydraulic oil, mineral oil, emulsified oil, vegetable oil/fats, wax, graphite, abrasives etc. The service length of the degreasing baths vary from days to months depending on the application. A prolongation of the service length can many times be achieved by separating particles and free oil by means of a physical method such as an oil skimmer, hydrocyclone, centrifugal separator, lamell separation, paper filter or membrane filter techniques. The last-mentioned technique is primarily used when a great part of the oil is emulsified into the degreasing bath. The materials which are recovered by membrane filtration are primarily alkali, phosphate and water while the main part of the surfactants will be removed by the filter.

A prolonged operation time does not only mean reduced disposal costs, but also reduced fixed costs, higher quality and better working environment.

SEPARATION OF WATER-SOLUBLE POLYMERS

A. Polymeric two-phase systems

When aqueous solutions of two polymers having different molecular weight, for example dextran (mw 500,000) and polyethyleneglycol (mw 8000) are mixed in certain concentrations a turbid solution will be obtained, which separates into two non-miscible phases within a few minutes. The top phase is rich in low molecular polymer, whereas the bottom phase is rich in the high molecular polymer. The concentration intervals in which phase separation occurs are exemplified in the phase diagram in FIG. 1.

By mixing two polymers $P_1$ and $P_2$ in water phase separation occurs above certain critical concentrations of the two polymers, whereas other mixtures result in a homogeneous solution. Concentration of polymers at or above the curved so-called binodial line will result in a two-phase system, whereas concentrations below the binodial line result in homogeneous solution of the polymers.

Figure 1:
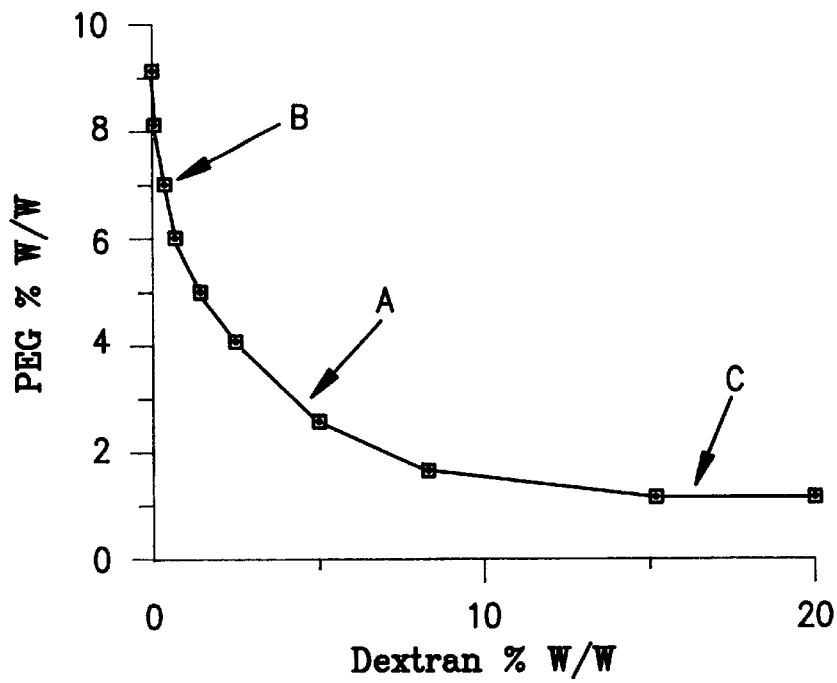
FIG. 1 is a phase diagram of a traditional two-phase system.

If choosing a polymer composition according to point A in FIG. 1, a two-phase system is created having about the same size of top and bottom phase. Point B results in a system having a big top-phase compared to the bottom phase, whereas point C provides a system having a small top phase compared to the bottom phase.

Soluble macromolecules such as a protein substantially distribute between the top phase and the bottom phase, whereas cells and cell particles substantially distribute between the top phase and the interphase between the phases as well as the bottom phase. The mechanisms which control the distribution are not fully known.

When a particle or a macromolecule is in a phase, the particle or macromolecule interacts with the surrounding molecules (polymers) in a complex manner. Various types of chemical bonds such as hydrogen bonds, ionic bonds and hydrophobic bonds are probably involved, together with other, weak forces. Their relative contributions are difficult to determine, but it is probable that their net effect is different in the two phases.

Cell particles are substantially distributed depending on their surface properties, i.e. hydrophilic/hydrophobic properties, electrostatic interactions between chemical groups on the cell wall and the polymer, and to a minor part because of the size. Changes of the composition of a two-phase system can thus dramatically affect the distribution of a cell.

Parameters Which Affect the Distribution

A very great number of polymers, which are suitable for design of two-phase systems, are commercially available today. They can be divided into uncharged and charged polymers. Dextrane and polyethyleneglycol is an example of two uncharged polymers which form two-phase systems. In those systems the distribution of cells primarily depends on hydrophilic/hydrophobic interactions between the cell walls and polymers. Addition of an inorganic salt will in this type of system result in an electrical potential between the interphase between the phases, because of uneven distribution of the ions between the phases. This so-called interphasial potential can dramatically affect the distribution of cells, especially cells having a high net charge. The size of the interphasial potential depends on the selection of the salt.

Another way of affecting the distribution pattern of cells or particles is to introduce charged polymers into the two-phase system. These charged polymers are often covalently bound molecules which are attached to non-ionic polymers, e.g. trimethylamino-poly-ethyleneglycol (positively charged), and sulphonylpolyethylene-glycol (negatively charged). Both the top and bottom phase polymers can be charged. By varying the pH in the system in combination with charged polymers, cells can e.g. be controlled between the top and bottom phase in that charged groups on particle/cell surfaces are attracted/repelled by the charged polymers.

Commercial polymers can be modified in many other ways for special, separation technological purposes. Examples thereof are to couple monoclonal antibodies to a polymer in order to enrich specific substances from complex mixtures, to couple complexing agents to a polymer for selective extraction of special metal-containing enzymes, to couple specific ligands to polymers for selective protein extraction.

DESCRIPTION OF THE INVENTION

B. Temperature-induced phase separation

Figure 2:
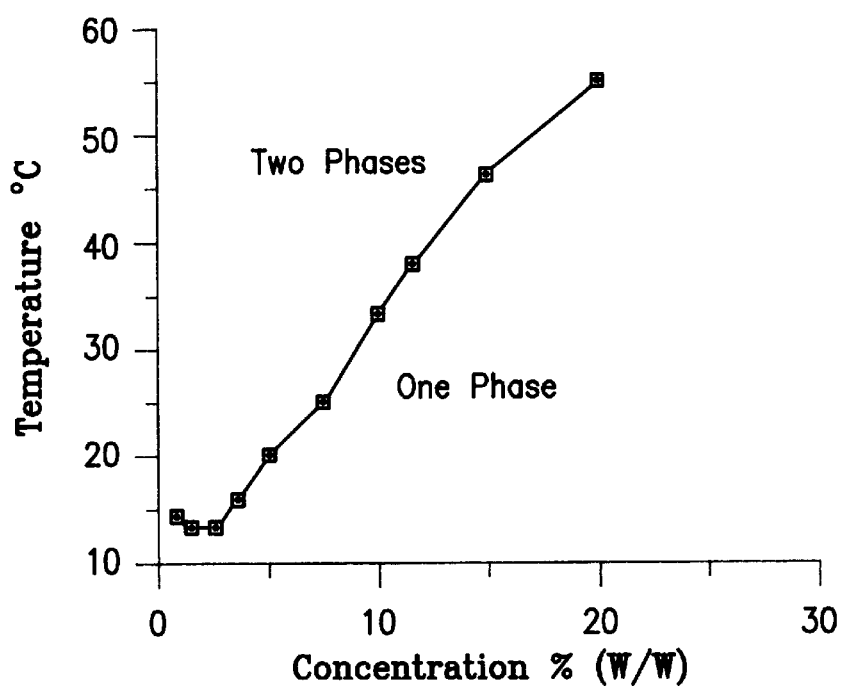
FIG. 2 is a phase diagram for a temperature-induced phase separation.

When a water soluble polymer such as UCON HB50, a so-called random co-polymer built up from ethylene oxide and propylene oxide (50:50), is heated above a certain critical temperature in aqueous solution, then the solubility of the polymer in water decreases and the so-called "cloud point" is achieved. In this condition the polymer will progressively separate from the aqueous phase and form a comparatively clean polymeric phase. This phase separation is a variation of polymeric two-phase systems. A typical phase diagram for a temperature-induced phase separation is also different from the above two-phase systems (FIG. 2).

Depending on the chemical composition of the polymer molecule as well as molecular weight etc., the "cloud point" varies considerably between different types of polymers. The "cloud point" of a 10% aqueous solution of UCON HB50 is, for example, about 55° C., whereas the "cloud point" of a 10% aqueous solution of polyethylene-glycol 20,000 is 112° C. Later studies have also shown that it is possible, with certain chemical substances, to manipulate e.g. lower the "cloud point", for example by adding sodium sulphate to 0.2M. The invention is characterized in that the collection polymer is a water soluble polymer having a cloud point in the range 5°–90° C., preferably 10°–60° C., especially 12°–25° C.

Research concerning the usefulness of temperature-induced phase separation as a separation method for macromolecules and particles such as cells is today very rudimentary.

Dapral T 210 (AKZO, the Netherlands), is a chemically modified dialkyl polyglycol ether which has a molecular weight of about 8,000, presents temperature-induced phase separation. The polymer has a central hydrophilic part which is diisocyanate ethylene diamine (diurethane part) to which ethylene oxide and propylene oxide is polymerized in both ends. The result is a polymer having hydrophobic ends and a hydrophilic central part.

The polymer can be mixed with water in concentrations down to 5% at room temperature. Below this concentration the polymer phase separates (FIG. 2). On phase separation the polymers bind comparatively great amounts of water compared to e.g. UCON.

Together with an aqueous solution of polyethylene-glycol or a polyoxyalkylene-glycol ether there will be formed a system having a top phase which is rich in polyethylene glycol or, alternatively, a polyoxyalkylene-glycol, and a bottom phase which is rich in Dapral T 210. In this system the lower phase will, however, be more hydrophobic to the upper phase, i.e. the opposite condition compared to traditional two-phase separation.

Parameters which effect the distribution in temperature-induced phase separation Like in the distribution in traditional two-phase systems, the separation between the phases will be influenced by hydrophilic/hydrophobic interactions between the phase polymer/polymers and the soluble macromolecules and/or particle which are distributed in the system. Charged control polymers which are distributed in either of the phases can, in combination with pH changes, also be used for affecting this operation.

EXAMPLE 1

A. Effect on the presence of tensides after polymer separation

To 100 ml of a washing liquid (Henkel 5175), collected directly from the production and containing 1% of in-emulsified mineral oil, there was added a mixture of Dapral T 210 (AKZO, the Nethterlands) and hydroxyethyl tall oil imidazoline (Berol 594) (Berol Kemi, Stenungssund, Sweden) to a final concentration of 0.2%. The ratio of Dapral 210 to Berol 594 was 4:1. The mixture was shaken well and centrifuged for 2 minutes at 2000 rpm, after which the superficial polymer/oil phase was separated by filtering through a paper filter. The pure washing liquid phase was analyzed regarding presence of in-emulsified oil, anionic, cationic and non-ionic tensides. The non-separated liquid was used as reference solution.

The results of tenside analysis of alkaline washing liquid after separation of in-emulsified oil (1% oil) by means of the polymer Dapral T 210 and the cationic tenside hydroxyethyl tall oil imidazoline (Berol 594) are presented in Table 1. As appears from the Table the greatest tenside reduction (90%), compared to the unseparated reference liquid, regards anionic tensides. For the non-ionic and cationic tensides the corresponding results were 18 and 32% respectively, compared to the non-purified washing liquid used.

The contents of in-emulsified oil was reduced by 94% after the separation.

In addition to alkali and completing agents alkaline washing liquids usually comprise non-ionic tensides. The anionic tensides enter as impurities from mineral oil based cutting liquid emulsions which have been used during the preceding metal working. The presence of the anionic tensides in the washing liquid increases the risk of mineral oil being in-emulsified into the washing liquid and also results in a deterioration of the washing result. As initially mentioned it is not possible to separate in-emulsified oil by means of conventional cleaning equipment for leaking oil such as oil skimmers, centrifugal separators, lamellar separators etc.

One way of removing in-emulsified oil is to use ultra-filtration. The disadvantage with this technique has proven to be that great parts (70–97%) of the washing active non-ionic tensides will be removed.

TABLE 1

Tenside concentration and oil contents in the washing liquids before and after separation

|  | Unseparated washing liquid | Separated washing liquid |
|---|---|---|
| Nonionic tenside % product 5175 | 3.6 | 3.1 |
| Cationic tenside % product 5175 | 1.3 | 0.89 |
| Anionic tenside |  |  |
| mg/l as Texcol C | 640 | 61 |
| mg/l as alkylsulphate | 37 | 3.5 |
| Oil contents, mg/l | 7180 | 440 |

EXAMPLE 2

Separation of In-Emulsified Mineral Oil from Washing Liquids

The following washing liquids were prepared;
1. Bonder V338M (Ytteknik AB, Uppsala, Sweden)-strongly alkaline, silicate-free degreasing agent. Dosage 15 g/litre.
2. Bonder V855M/1 (Ytteknik AB)-strongly alkaline, silicate-containing degreasing agent. Dosage 25 g/litre.
3. Bonder 4815 (Ytteknik AB)-mildly alkaline without tenside, contains sodium phosphate. Dosage 35 g/litre+ Ytex f/1 non-ionic spraying tenside. Dosage 3.5 g/litre.

Emulsion concentrate (Ratak resist 68 CF, FUCHS, Mannheim, Germany), was added to each of the washing liquids to a final concentration of 0.5–0.7%. A mixture of Dapral T 210 and Berol 594 (mixing ratio 4:1) was added to 200 ml of the respective washing liquid having in-emulsified oil. The solution was then mixed thoroughly and allowed to separate gravimetrically for 30 minutes. After the separation the surface layer of oil/polymer was separated by filtering through a paper filter. The oil concentration before and after separation was determined by acid extraction with solvents in combination with IR-analysis.

Separation of Graphite Contaminants from Washing Liquids

Graphite particles, obtained from a grinding liquid from hard metal working, were added to the above mentioned washing liquids (without in-emulsified mineral oil). 0.1% of a mixture of Dapral T 210 and Berol 594 (mixing ratio 4:1) was added to 500 ml of the respective washing liquid after which the solution was thoroughly mixed and allowed to separate gravimetrically for 60 minutes. The particle contents of polymer separated liquid and of the corresponding liquid without added polymer as a reference, was quantified by filtration of the liquid in combination with weighing.

If there is no in-emulsified oil present in the washing system, the Dapral polymer will, when mixed into the system, form a turbid solution which separates after a while to form a polymer bottom-phase phase which is rich in water. Depending on the polymer concentration the size of the bottom phase can be varied. This bottom phase can be used as a collection phase for solid particulate contaminants and soluble contaminants. If only the Dapral polymer is used in the system, then the distribution of soluble or particulate substances will substantially be controlled by hydrophilic/hydrophobic interactions between the particulate/soluble substances and the bottom phase polymer. By introducing charged polymers or compounds distributing in the top or bottom phase, charge interactions can be used for controlling the separation. The separation of graphite particles and bacterial cells from a plurality of washing liquids illustrates the possibilities of such application (Tables 3 and 4).

TABLE 3

Separation of graphite particles from three washing liquids by means of polymer separation

|  | Bonder V338M | Bonder V8551M/1 | Bonder 4815 |
|---|---|---|---|
| Graphite conc. before separation mg/l | 745 | 585 | 1050 |
| Graphite conc. after separation mg/ml | 17.5 | 12.1 | 41.7 |
| Purification (%) | 98 | 98 | 96 |

For separating graphite particles from the three washing liquids a low concentration dosage of the Dapral polymer and hydroxyethyl tall oil imidazoline are used, thereby creating a system having a bottom phase consisting of about 2–3% of the total system. As appears from Table 3 a very good separation (96–98%) of graphite particles in the three washing liquids is obtained. The separation efficiency is not very much affected by the addition of hydroxyethyl tall oil imidazoline which in particular indicates that hydrophilic/hydrophobic interactions between the graphite particles control the distribution of particles to the bottom phase. The hydroxyethyl tall oil imidazoline however influences the speed of separation in the system by accelerating the coalescence of polymer drops; this can be of interest when choosing the separation system, e.g. lamellar separators versus centrifugal separators.

Separation of Bacteria from Washing Liquids

Bacterial cells of Pseudomonas aeruginosa were added to 50 ml of the respective washing liquid, as described under point B, to a final concentration of above $10^9$ cells/ml. 0.1% of a mixture of Dapral T 210 and Fennopol K2800 (Kemira Oy, Finland) (mixing ratio 70:1) was added to the respective washing liquid, after which the solution was thoroughly mixed. The solutions were centrifuged at 2000 rpm for two minutes together with the respective washing liquid as a reference sample without added polymer. The bacterial contents in the washing liquids before and after centrifugation, with and without phase separation, was quantified using a HACH turbidimeter (Svenska Merkanto, Uppsala, Sweden).

For bacterial separation the best results w ere obtained when using the Dapral polymer in combination with the strongly cationic polymer Fennopol K2800 (Table 4). At the high pH prevailing in the system the cationic polymer will interact with negative surface charges on the bacterial cells and result in a concentration of bacterial cells to the bottom phase which is rich in Dapral/Fennopol. Tests which were carried out for a plurality of industrial washing liquids, with addition of only the Dapral polymer (0.1–0.2%), reduced the bacterial contents in the systems by about 40–50%. Corresponding results with the Dapral polymer and hydroxyethyl tall oil imidazoline (0.2%) varied between 50–85%.

TABLE 4

Separation of bacterial cells from three washing liquids by means of polymer separation.

|  | Bonder V338M | Bonder V855M/1 | Bonder 4815 |
|---|---|---|---|
| Bacterial contents before separation (NTU) | 68 | 49 | 75 |
| Bacterial contents after separation (NTU) | 5.1 | 2.2 | 9.2 |
| Purification (%) | 93 | 96 | 88 |

As appears from Table 4 the separation efficiency was considerably better in the Dapral/Fennopol system (88–96%). Also in t his system the bottom phase constituted about 2–3% of the total system, but the intermix of Fennopol does not have any direct effect of the coalescing velocity of the polymer drops which results in a slower separation speed compared to the system containing hydroxyethyl tall oil imidazoline.

Field-Scale Purification of Washing Liquid.

5 liters of Dapral T 210 and Berol 594 (mixing ratio 4:1) dissolved in water was added to 400 litre of the washing liquid described under point A. The concentration of active substance in the system was 0.18%. The solution was thoroughly mixed by means of a submergible pump and was allowed to separate gravimetrically overnight (12 hours). After separation the separated liquid was separated by means of a submersible pump which was enclosed in a filter bag (paper filter). The oil concentration before and after separation was determined by acid solvent extraction in combination with IR-analysis. Tenside analysis was performed using colometrical methodology by Vadstena kemanalys.

The purified washing liquids were test washed by machine-washing, and the foaming characteristics and the washing result were studied.

Separation of in-emulsified mineral oil from three types of alkaline washing liquid system is presented in Table 2. The contents of mineral oil in the untreated washing liquids varied between 0.6 and 0.7%. After polymer separation the oil contents was reduced by 90–99%.

TABLE 2

Separation of in-emulsified oil from three washing liquids by means of polymer separation.

|  | Bonder V338M | Bonder V855M/1 | Bonder 4815 |
|---|---|---|---|
| Oil contents before separation mg/l | 5645 | 4870 | 6550 |
| Oil contents after separation mg/ml | 55 | 146 | 65 |
| Purification (%) | 90 | 97 | 99 |

The mechanism for the polymer separation is that the anionic tensides will be efficiently collected by the Dapral polymer thereby releasing the emulsified oil. The function of the hydroxyethyl tall oil imidazoline is to reduce the water-solubility for the Dapral polymers since certain compounds can increase the water-solubility of the polymer. The cationic action of the hydroxyethyl tall oil imidazoline will also react with the anionic tensides and improve the separation thereof. Upon separation the polymer follows the released oil and forms a small surface phase which can be separated by means of conventional oil separation systems.

EXAMPLE 6

Purification of effluent water from oil fired combined power and heating plants as regards oil Great amounts of water are used in oil fired combined power and heating plants in order to extract small amounts of inorganic salts of the sodium and potassium types from oil. The purpose of the extraction is to reduce the risk of coatings being formed on the turbin blades in connection with the combustion process. After the aqueous extraction the water and oil are separated by means of centrifugal separators. The effluent water after separation contains residual oil in amounts greater than 15 ppm, usually about 40–100 ppm. Amounts of residual oil which are less than 15 ppm are preferred when dumping effluent water in the nature.

Varying concentrations of polymer (Dapral 210) and hydroxyethyl tall oil imidazoline (Berol 594) were added to 100 ml of effluent water in accordance with Table 1. The samples were well mixed and centrifuged at 2000 rpm for two minutes. After separation 1 ml samples were withdrawn. Each sample was acidified with HCl to a pH of 2 and was extracted with 1 ml of dichloromethane for 30 minutes. The total amount of hydrocarbons was recorded using gas chromatography (Hewlett Packard 5890) in combination with mass-spectrometry (Hewlett Packard 5971). A 50 meter crosslinked methyl silicone capillary column (HP 1, Hewlett Packard) having an inner diameter of 0.32 mm and a film thickness of 1.05 $\mu$m was used. The injections were made splitless for 2 minutes. The column pressure was set to 5 psi, the injection temperature was 200° C. and the detector temperature was 240° C. The oven temperature was programmed for an initial hold at 35° C. for 5 minutes, whereafter the temperature was increased to 290° C. at a rate of 8° C. per minute and was kept at that temperature for 20 minutes. The flow rate of carrier gas (helium) was 1 ml per minute.

Table 6 shows the contents of residual oil in the effluent water after separation for varying concentrations of polymer and hydroxyethyl tall oil imidazoline. As appears from the table the sample had a total oil contents of 47 mg/l before separation. When dosing only polymer (480 mg/l) the contents of residual oil was reduced to 11.6 mg/l. However, in this case only a small part (3.6 mg/l) of residual polymer was retained in the purified water. Addition of hydroxyethyl tall oil imidazoline in combination with the polymer provides improved separation of oil from water as well as reduction of the amount of residual polymer in the water phase. At a dosage of 480 mg/l of both polymer and hydroxyethyl tall oil imidazoline the contents of the residual oil in the effluent water was 2.5 mg/l and the concentration of residual polymer was 2.0 mg/l.

EXAMPLE 7

Purification of bilge water from ships containing small amounts of oil contaminants Bilge water in ships comprises a complex mixture of leaking water and washing water contaminated with oil (hydraulic oils, fuel oils and lubricating oils), tensides etc. Dumping of bilge water directly into the sea used to be permitted, but this is no longer possible because of environmental reasons.

Varying concentrations of polymer (Dapral 210) and hydroxyethyl tall oil imidazoline (Berol 594) and sodium sulphate were added to 100 ml bilge water in accordance with Table 7. The samples were mixed well and centrifuged at 2000 rpm for 2 minutes. After the centrifugation a sample was taken and tested in the same manner as described above in Example 6.

The total contents of hydrocarbon compounds in the bilge water sample was 56.2 mg/l before separation (see Table 7). Dosage of only polymer (600 mg/l) resulted in a reduction of the residual oil in the water phase to 10.9 mg/l. In this case the residual polymer content in the purified bilge water corresponded to 5.3 mg/l. A progressive increase of the contents of hydroxyethyl tall oil imidazoline together with polymer improves the oil separation and results in a gradual decrease of the residual polymer contents in the water. Thus, a dosage of 600 mg/l of polymer and 200 mg/l of hydroxyethyl tall oil imidazoline after separation resulted in a residual oil contents corresponding to 3.4 mg/l and a residual polymer contents corresponding to 1.3 mg/l. Dosage of an aqueous solution of an inorganic salt such as sodium sulphate, together with polymer or, alternatively, polymer/hydroxyethyl tall oil imidazoline, improved the oil separation and resulted in a reduced concentration of residual polymer in a purified water phase.

EXAMPLE 8

Separation of in-emulsified water from bitumen

Crude oil (bitumen) from Venezuela is highly viscous (about 300 CSt at 98° C.). In order to make it possible to recover the oil fraction, water is in-emulsified together with non-ionic tensides in the oil. The result is an oil which can be pumped at room temperature. The water contents is about 30% and the contents of tensides corresponds to 2500 mg/l. In order to refine the oil it is in certain situations necessary to separate the in-emulsified water from the oil.

150 g of a crude oil containing water was heated to 98° C. while stirring. To the heated oil was added 0.1% of a solution consisting of 10% of polymer (Dapral 210), 3% of hydroxyethyl tall oil imidazoline (Berol) and 87% of water. The corresponding heated oil, without added polymer/hydroxyethyl tall oil imidazoline, was used as a control. The oil samples were centrifuged at 2000 rpm and 98° C. for 5, 10, 15 and 20 minutes respectively. After separation the oil top phase was removed, whereupon the water content was determined by means of Karl Fisher-analysis. The separated aqeuous phase was analyzed by gas chromatography in combination with mass-spectrometry as described above.

Figure 3:
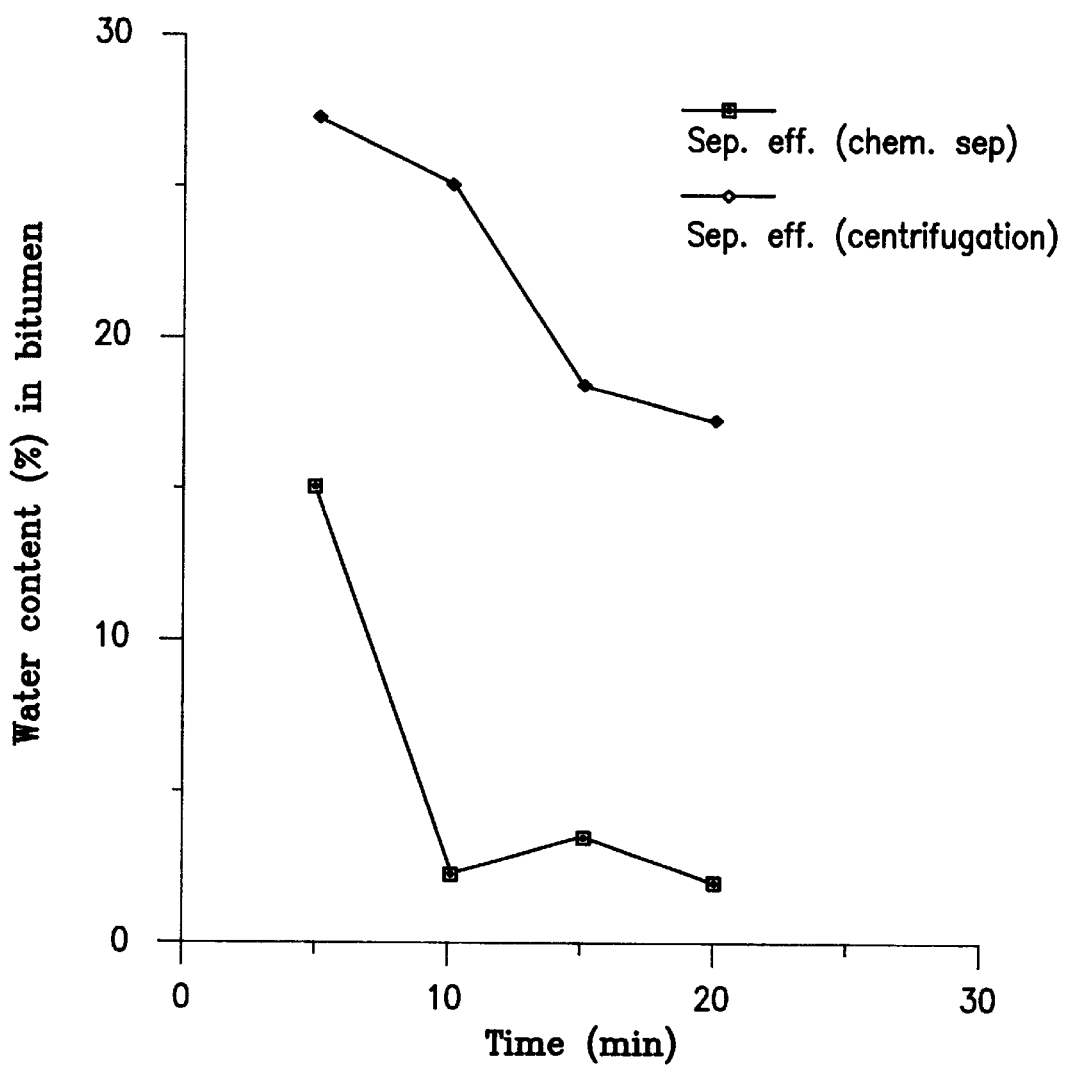
FIG. 3 is a diagram of chemical separation vs. centrifugation.

Separation of in-emulsified water with and without addition of polymer/hydroxyethyl tall oil imidazoline, are shown in FIG. 3. As appears from this figure a much improved separation of water in connection with polymer/hydroxyethyl tall oil imidazoline dosage in combination with centrifuging, compared to centrifuging only. Already after centrifuging for 5 minutes the water contents of the oil was reduced by 50%, and after 10 minutes the amount of residual water in the oil was less than 3%. Without addition of polymer/hydroxyethyl tall oil imidazoline a reduction of less than half of the water contents in the oil was achieved after 20 minutes. Analysis of the aqueous phase after separation showed a residual oil contents of 4.4 mg/l when treated with polymer/hydroxyethyl tall oil imidazoline, compared to 150 mg/l when treated by separation only.

TABLE 6

(effluent water)

| Sample No. | Polymer conc. mg/l | Imidazoline conc. mg/l | Oil+ polymer conc. mg/l | Oil conc. mg/l | Residual polymer conc. mg/l |
|---|---|---|---|---|---|
| 1 | 0 | 0 | 47 | 47 | 0 |
| 2 | 480 | 0 | 15.2 | 11.6 | 3.6 |
| 3 | 480 | 120 | 6.0 | 2.2 | 3.8 |
| 4 | 480 | 480 | 4.5 | 2.5 | 2.0 |
| 5 | 720 | 240 | 6.9 | 2.8 | 4.1 |
| 6 | 720 | 480 | 4.7 | 1.2 | 3.5 |
| 7 | 1200 | 240 | 6.8 | 0.8 | 6.0 |
| 8 | 1200 | 480 | 7.5 | 2.2 | 5.3 |
| 9 | 1200 | 0 | 9.1 | 2.3 | 6.8 |

TABLE 7

(bilge water)

| Sample No. | Polymer conc mg/l | Imidazoline conc. mg/l | $Na_2SO_4$ conc. M | Oil+ polymer mg/l | Oil conc. mg/l | Residual polymer conc. mg/l |
|---|---|---|---|---|---|---|
| 1 | 0 | 0 | 0 | 56.2 | 56.2 | 0 |
| 2 | 600 | 0 | 0 | 16.2 | 10.9 | 5.3 |
| 3 | 600 | 100 | 0 | 6.5 | 4.2 | 2.3 |
| 4 | 600 | 200 | 0 | 4.7 | 3.4 | 1.3 |
| 5 | 600 | 400 | 0 | 7.9 | 7.65 | 0.25 |
| 6 | 600 | 800 | 0 | 6.7 | 6.6 | 0.10 |
| 7 | 600 | 0 | 0.1 | 8.8 | 6.2 | 2.6 |
| 8 | 600 | 400 | 0.1 | 3.7 | 3.2 | 0.5 |

EXAMPLE 9

Purification of Oil-Containing Water from Car Washing Plants

Washing water from the washing of cars contains a plurality of contaminants of the type oil and asphalt residues, degreasing agents, soot, sand, heavy metals, etc. The water is circulated and purified by means of various sedimentation tanks and lamella separators. As time passes oil is in-emulsified into the washing water. As a result it will after a while be necessary to damp the water.

To 100 g of washing water which was contaminated with oil was given a dosage of 0.1–0.8% of a solution consisting of 10% of polymer (Dapral 210), 3% imidazoline (Berol 594) and 87% of water. The samples were mixed well and centrifuged at 2000 rpm for 2 minutes. After separation the purified aqueous phase was analyzed gas chromatographically and by mass spectrometry as above.

As appears from Table 8 the contents of emulsified oil in the car washing water before separation amounted to 78.6 mg/l. Already after a dosage of 0.1% polymer/imidazoline-mixture the oil contents was reduced to 30.2 mg/l and at a dosage of 0.2 and 0.4% to 15.8 and 5.4 mg/l respectively. A further dose (0.8%) did not result in any additional reduction of the oil contents.

TABLE 8

Separation of emulsified oil in washing water from a car washing station after dosage of varying concentration of a polymer/imidazoline mixture

| Sample No. | Dosage (%) | Oil content (mg/l) |
|---|---|---|
| 1 | 0 | 78.6 |
| 2 | 0.1 | 30.2 |
| 3 | 0.2 | 15.8 |
| 4 | 0.4 | 5.4 |
| 5 | 0.8 | 6.1 |

I claim:

1. A method of purifying aqueous degreasing liquids contaminated with particles and emulsified oil, which comprises
   a) adding at least one collection polymer or polymer mixture capable of forming two-phases to an aqueous degreasing liquid;
   b) mixing said at least one collection polymer with the degreasing liquid;
   c) separating the collection polymer and the aqueous degreasing liquid so as to have collection polymer and the major part of the contaminating particles to form a hydrophobic bottom phase and the aqueous degreasing liquid to form a top phase, whereby said oil is de-emulsified so that the oil forms a thin polymer/oil layer at the surface of the aqueous degreasing liquid;
   d) removing the bottom phase and the thin polymer/oil layer; and
   e) reusing the aqueous degreasing liquid directly or processing the liquid further.

2. The method according to claim 1, wherein the said collection polymer is a water soluble polymer having a cloud point in the range 10°–25° C.

3. The method according to claim 2, wherein the collection polymer is a chemically modified polyglycol ether which has a central diurethane part to which ethylene oxide and propylene oxide are polymerized in both ends.

4. The method according to claim 3, wherein the polymer has a molecular weight of 3000–8000.

5. The method according to claim 1, wherein a charged tenside or a charged polymer is added together with the collection polymer, said tenside or polymer interacting with the contaminating particles in the degreasing liquid so as to increase the proportion of contaminating particles in the bottom phase formed in step c.

6. The method according to claim 5, wherein the charged tenside is a hydroxyethyl tall oil alkyl imidazoline (HTI).

7. The method of claim 6 wherein said polymer and said HTI is in a mixing ratio polymer/HTI of 1:1.

8. The method according to claims 1, 2, 3, 4, 5, 6 or 7, wherein a complexing agent is added in step a or b.

9. The method according to claims 1, 2, 3, 4, 5, 6 or 7, wherein the bottom phase and the polymer/oil are separated from the degreasing liquid in a centrifugal separator.

10. The method according to claim 6, wherein said polymer and said HTI is in a mixing ratio polymer/HTI of about 1:0.5.

11. The method according to claim 6, wherein said polymer and said HTI is in a mixing ratio polymer/HTI of about 1:0.3.

* * * * *